Nov. 19, 1935.  E. C. FIEBERTS  2,021,178
BATTERY TESTING APPARATUS
Filed March 7, 1930   2 Sheets-Sheet 1
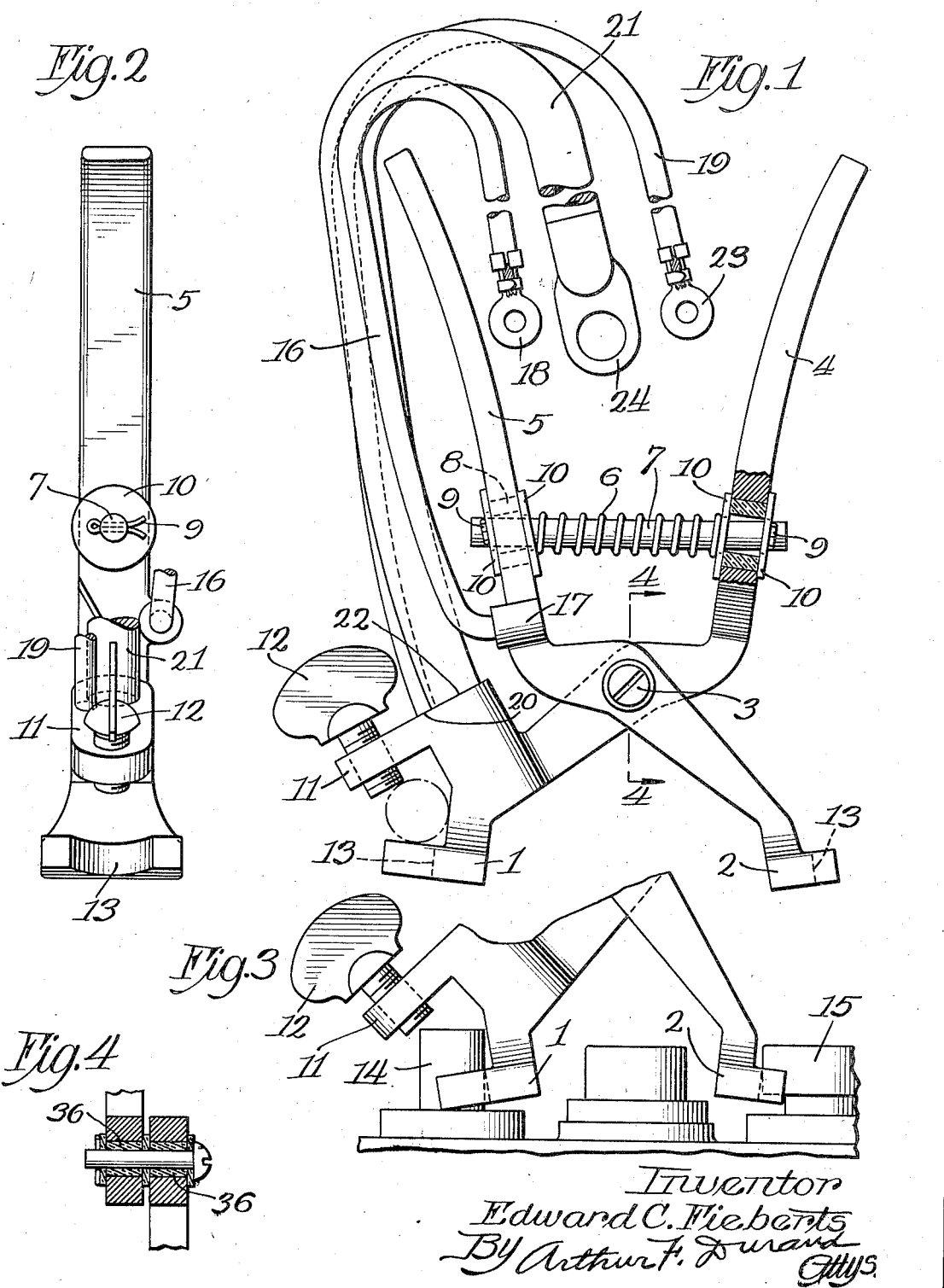
Inventor
Edward C. Fieberts
By Arthur F. Durand
Attys.

Nov. 19, 1935.  E. C. FIEBERTS  2,021,178

BATTERY TESTING APPARATUS

Filed March 7, 1930  2 Sheets-Sheet 2

Inventor
Edward C. Fieberts
By Arthur F. Durand
Atty.

Patented Nov. 19, 1935

2,021,178

UNITED STATES PATENT OFFICE 2,021,178

BATTERY TESTING APPARATUS

Edward C. Fieberts, Benton Harbor, Mich., assignor to Pier Equipment Manufacturing Co., Benton Harbor, Mich., a corporation of Michigan Application March 7, 1930, Serial No. 433,867

1 Claim. (Cl. 173—324)

This invention relates to devices for testing batteries, and more particularly to the devices for connecting the storage battery to the testing instruments, such as voltmeters and ammeters.

Generally stated, the object of the invention is to provide an improved testing apparatus, having a device in the form of a tool or implement, which can be readily attached to the battery, and which can be readily detached therefrom, either when the battery is in a shop, or when the battery is on the motor vehicle.

It is also an object to provide certain details and features of construction and combinations tending to increase the general efficiency and the desirability of a battery-testing apparatus of this particular character.

To the foregoing and other useful ends, the invention consists in matters hereinafter set forth and claimed and shown in the accompanying drawings, in which—

Fig. 1 is a side elevation of the said tool or implement and the electrical connections extending therefrom, embodying the principles of the invention;

Fig. 2 is an edge view or a view of the device shown in Fig. 1 in the plane thereof, looking at the left-hand side of the device as shown in Fig. 1, and showing said electrical connections broken away for convenience of illustration;

Fig. 3 is a fragmentary detail view showing the method of hooking the said tool or implement onto the battery;

Fig. 4 is a detail section on line 4—4 in Fig. 1;

Figure 5:
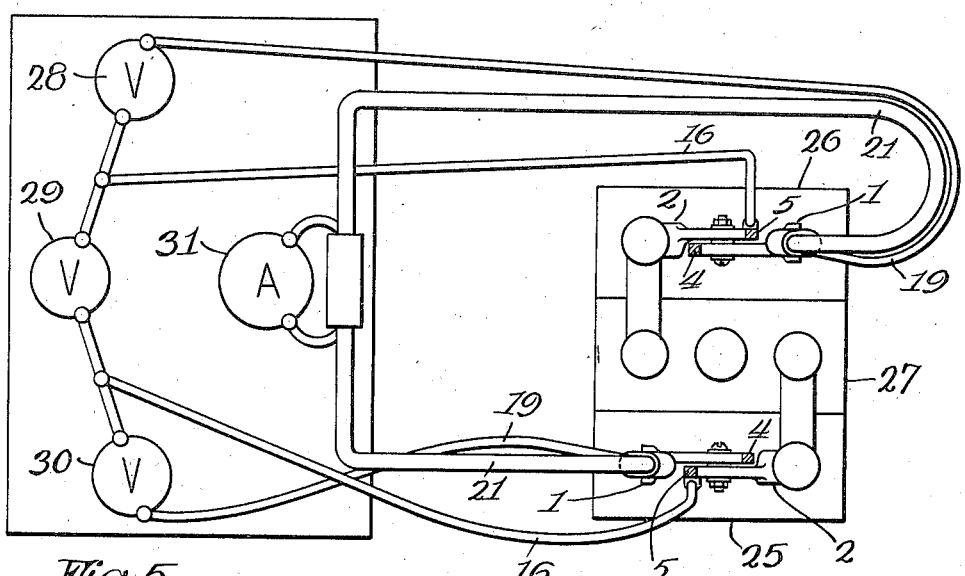
Fig. 5 is a diagram illustrating the method of using the invention for the testing of a storage battery, when it is desired to test the voltage of each cell of the battery separately.

As thus illustrated, referring to Figs. 1 to 4, inclusive, the invention comprises a pair of engaging portions 1 and 2, pivoted together at 3 and provided, respectively, with integral handles 4 and 5, whereby movement of these handles toward each other will cause the engaging portions 1 and 2 to move toward each other. The two handles are held normally apart by a coil spring 6, disposed between the two handles, on a rod 7, which is mounted to slide in insulating bushings 8 in the two handles. The end portions of the rod 7 are provided with cotter pins 9 to prevent the rod from slipping out of place. Washers 10, preferably of insulating material, are provided on the said rod, at opposite sides of the bushings 8, as shown, and with this arrangement the spring 6 serves to yieldingly hold the handles and engaging portions 1 and 2 in normal position, as shown.

The engaging portion 1 has an integral portion 11, which is provided with a thumb screw 12, as shown. It will be seen that the portions 1 and 2 are preferably notched at 13, on their outer sides, to enable them to engage the battery terminals 14 and 15, as shown in Fig. 3 of the drawings, the spring 6 at such time tending to move the two portions 1 and 2 away from each other, whereby they are maintained firmly in engagement with the said battery terminals.

The flexible electrical conductor 16 is connected to the portion 2 of the handle 5 at 17, and is provided at its end with a terminal 18 for connection with the testing instruments, as will hereinafter more fully appear. A similar flexible electrical connection 19 is connected with the portion 1 at 20, while the larger and heavier flexible electrical conductor 21 is connected with the portion 1 at 22, as shown in Fig. 1 of the drawings. Terminals 23 and 24 are applied, respectively, to the ends of the conductors 19 and 21, as shown.

One method of using the invention for testing a storage battery is shown in Fig. 5 of the drawings, in which case it will be seen that two of the devices shown in Fig. 1 are employed for this purpose, one device being on the positive terminal cell 25, and the other device being on the negative terminal cell 26 of the battery, the latter having also a middle cell 27, as shown. The three cells are connected in series, as usual, for use on the motor vehicle. The testing instruments 28, 29, and 30 are voltmeters of any suitable character, while the instrument 31 is an ammeter of suitable character. The previously mentioned conductors 16, 19, and 21 are connected up, as shown in Fig. 5 of the drawings, and under such conditions the three voltmeters will each test one of the battery cells separately, for voltage, while the ammeter will show the current strength of the battery. The two devices, of the kind shown in Fig. 1 of the drawings, are easily applied to the battery, it will be understood, by simply squeezing the two handles 4 and 5 toward each other, thereby to permit the engaging portions 1 and 2 to move toward each other a sufficient distance to enable them to engage the inner sides of the battery terminals, as shown in Fig. 3 of the drawings. When it is desired to disconnect the battery from the testing instruments, the handles 4 and 5 are moved toward each other, thereby to disengage the portions 1 and 2 from the battery terminals.

Figure 6:
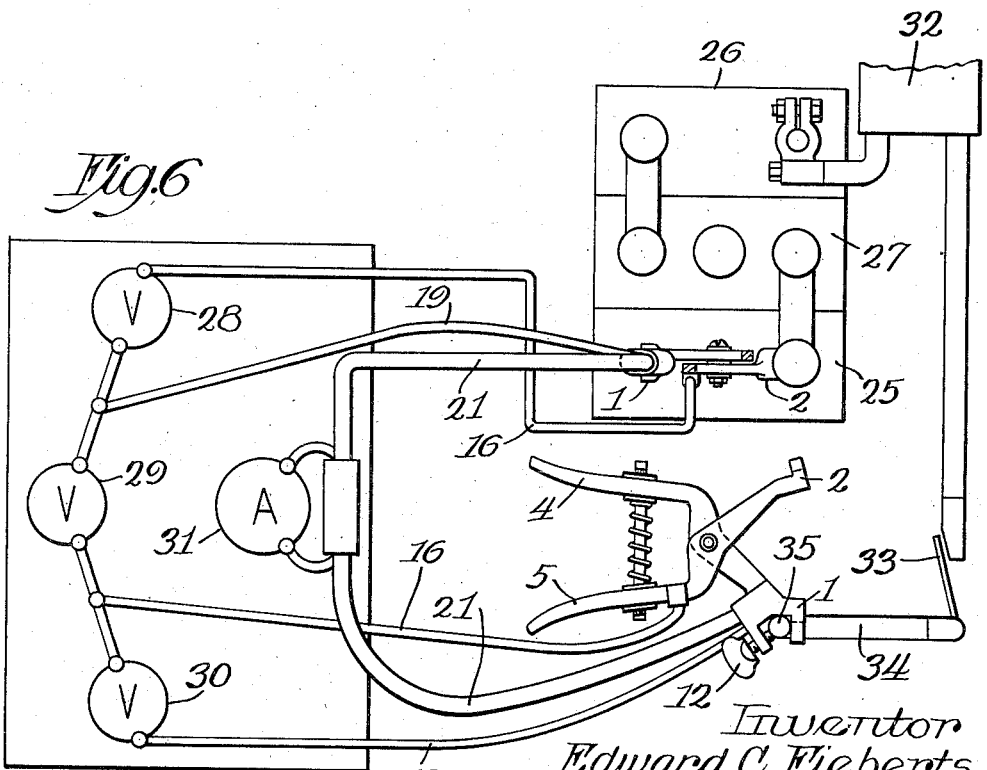
Fig. 6 is a diagram showing the method of using the invention for testing the storage battery on the motor vehicle, in series with the starter, to show the voltage of the battery cells in series, as well as the amperage thereof.

As shown in Fig. 6 of the drawings, the same battery is being tested while on the motor vehicle, in series with the starter 32, which latter may be of any suitable character. The ordinary foot-switch 33 is provided for closing the starter circuit, and under such circumstances the invention will indicate the voltage of the three battery cells in series, and will also show the amperage strength of the battery. As shown, one device of the kind shown in Fig. 1 is hooked to the terminals of the cell 25, while the other device is hooked to the connection 34, leading to the switch 33, previously mentioned. The connection 34 has an end portion 35 that is clamped firmly in place by the set screw 12, previously mentioned. In Fig. 6 it is the total or cumulative voltage on voltmeters 28, 29, and 30 that indicates the total voltage of the battery.

Thus, the tool or implement, such as the device shown in Fig. 1 of the drawings, is adapted for use in different ways, and may be used as shown in Fig. 5, or as shown in Fig. 6 of the drawings, the device having provisions to make it applicable for either purpose. The swivel or pivotal connection 3 between the two members of the device is preferably provided with insulation 36, as shown in Fig. 4 of the drawings, whereby the portion 1 is thoroughly insulated from the portion 2, thereby to prevent any undesirable short circuiting.

Thus, it will be seen that the flexible and insulated electrical conductors 19 and 21 lead from the engaging member 1, from a point between the end of this member and the pivot thereof, at one side of the device. It will also be seen that the flexible conductor 16 leads from the handle of the member 2, at the same side of said device, whereby these flexible conductors are all at one and the same side of the device thus provided for making electrical connections. In this way, the two handles are left free to be grasped and manipulated by one and the same hand of the person using the device.

What I claim as my invention is:

A device for testing storage batteries, comprising a pair of pivoted members insulated from each other and having engaging portions for engaging storage battery terminals, said members having handles for controlling or operating said engaging portions, and spring means insulated from said members to yieldingly and normally keep said handles spread apart, together with connecting means for connecting the device to a testing instrument, leading from one side of said device, leaving said handles free, having means to grip a single flexible electrical conductor extending from one member, and means to grip a plurality of such conductors extending from the other member, together with means on the multiple conductor member to grip a flexible conductor terminal or end portion, said gripping means comprising a set screw adapted to cooperate with one of said engaging portions to grip said terminal or end portion.

EDWARD C. FIEBERTS.